United States Patent [19]

Yu

[11] Patent Number: 5,645,041
[45] Date of Patent: Jul. 8, 1997

[54] BARBECUE COOKER

[76] Inventor: Norman Y. C. Yu, No.57,Sec.1,Ten-Sin RD., Fong-Yuan City, Taichung Hsien, Taiwan

[21] Appl. No.: 670,419

[22] Filed: Jun. 26, 1996

[51] Int. Cl.$^6$ ................................................. A47J 37/00
[52] U.S. Cl. .................... 126/25 R; 126/9 R; 16/357
[58] Field of Search ................ 126/25 R, 41 R, 126/9 R, 9 B; 220/335, 333; 99/337, 450, 645; 16/357

[56] References Cited

U.S. PATENT DOCUMENTS

| | | | |
|---|---|---|---|
| 4,062,340 | 12/1977 | Huff | 126/25 R |
| 4,523,574 | 6/1985 | Schlosser | 126/25 R |
| 5,036,832 | 8/1991 | Schlosser | 126/25 R |
| 5,499,573 | 3/1996 | Lin | 126/25 R |

Primary Examiner—James C. Yeung
Attorney, Agent, or Firm—Bacon & Thomas

[57] ABSTRACT

A barbecue cooker includes a bowl and a cover mounted to the bowl, the bowel having two ears diametrically disposed to an outer peripheral surface thereof, each of the ear having a curved upper surface, a vertical side and a horizontal side, the vertical side having a first flange extending therefrom and the horizontal side having a second flange extending therefrom, the first flange having a first plate extending perpendicularly from an outer edge thereof and the second flange having a second plate extending perpendicularly from an outer edge thereof so as to define a recess between the first flange, the second flange, the first plate, the second plate and an outer surface of the ear, a hole defined in each of the ears, a handgrip pivotally connected between the two holes of the ears such that the handgrip can be snugly received between the first plate and the outer surface of the ear when in a vertical position and snugly received between the second plate and the outer surface of the ear when in a horizontal position.

5 Claims, 5 Drawing Sheets

BARBECUE COOKER

BACKGROUND OF THE INVENTION

1. Field of the Invention

The present invention relates to a barbecue cooker and more particularly, to a barbecue cooker comprising a bowel and a cover which is mounted to the bowl by two ears respectively diametrically disposed to the bowl with a handgrip connected therebetween, with the handgrip being disposable in a vertical position or a horizontal position and the cover can be supported on the handgrip in the horizontal position.

2. Brief Description of the Prior Art

A known barbecue cooker is disclosed in U.S. Pat. No. 4,062,340, entitled as "outer grill" to George L Huff. The grill as disclosed Huff's patent has two hinge sets each pivotally disposed to opposite sides of the grill and a cover of the grill can be positioned to a desired open position by the two hinge sets. Such a grill has the following, shortcomings:

(1) There has no suitable handgrips so that the grill cannot be moved if the grill is still at a high temperature.

(2) The two hinge sets are disposed to an inner peripheral surface of both the bowl and the cover such that food and grill sauce could attach to the hinge sets when using the grill. Sanitary problems may arise if food contacts the hinge sets which are not heated directly and have sauce and food residual attached thereto. Furthermore, the hinge sets will be difficult to operate after a long-term utilization because food residual and sauce are attached on the hinge sets.

The present invention intends to provide a barbecue cooker which has two ears diametrically disposed to an outer periphery of the bowl and a handgrip connected between the two ears each of which has a slot defined therein such that the handgrip can be positioned to a horizontal position and the cover can be supported by the handgrip when in an open position.

Therefore, there has been a long and unfulfilled need for a barbecue cooker to have two ears and a handgrip connecting between the two ears such that the barbecue cooker can be moved or carried conveniently and when the handgrip is in a horizontal position, the cover can be supported on the handgrip.

SUMMARY OF THE INVENTION

The present invention provides a barbecue cooker which includes a cover having a curved top with a handle extending upwardly from a center of the top, a bowl, two ears diametrically disposed to an outer peripheral surface of the bowl and a handgrip pivotally connected between the two ears. Each of the ears has a curved upper surface, a vertical side and a horizontal side, the vertical side having a first flange extending therefrom and the horizontal side having a second flange extending therefrom. The first flange has a first plate extending perpendicularly from an outer edge thereof and the second flange has a second plate extending perpendicularly from an outer edge thereof so as to define a recess between the first flange, the second flange, the first plate, the second plate and an outer surface of the ear, a hole defined in each of the ears.

The handgrip has a U-shaped configuration and has two extending portions each having a protrusion extending transversely from a distal end thereof, each of the protrusions inserted into the hole of the ear corresponding thereto and each of the extending portions alternatively received a vertical position between the first plate and the outer surface, and a horizontal position between the second plate and the outer surface of the ear corresponding thereto.

It is an object of the present invention to provide barbecue cooker which has two ears and a handgrip pivotally connected between the two ears.

It is another object of the present invention to provide a barbecue cooker which handgrip can be positioned to a vertical position and a horizontal position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
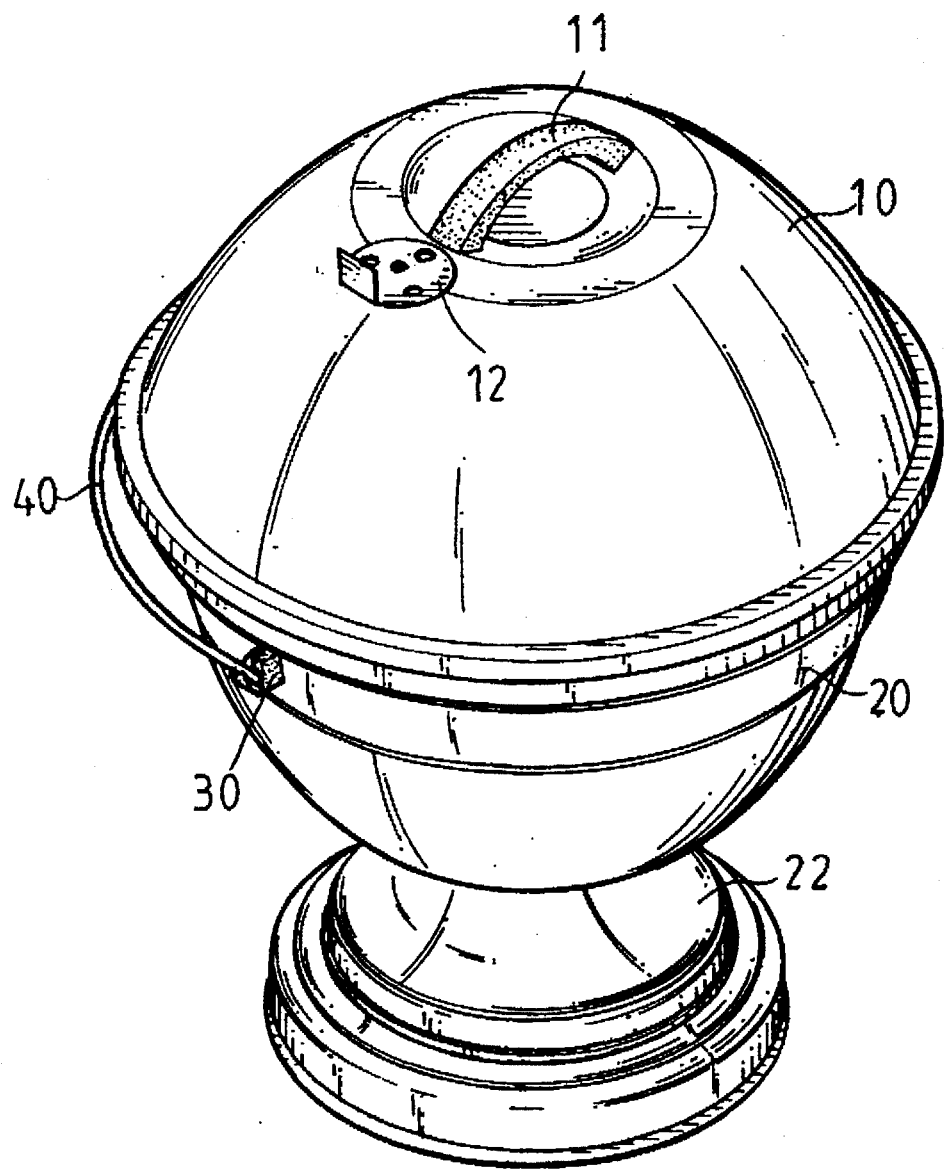
FIG. 1 is a perspective view of a barbecue cooker accordance with the present invention.
Figure 2:
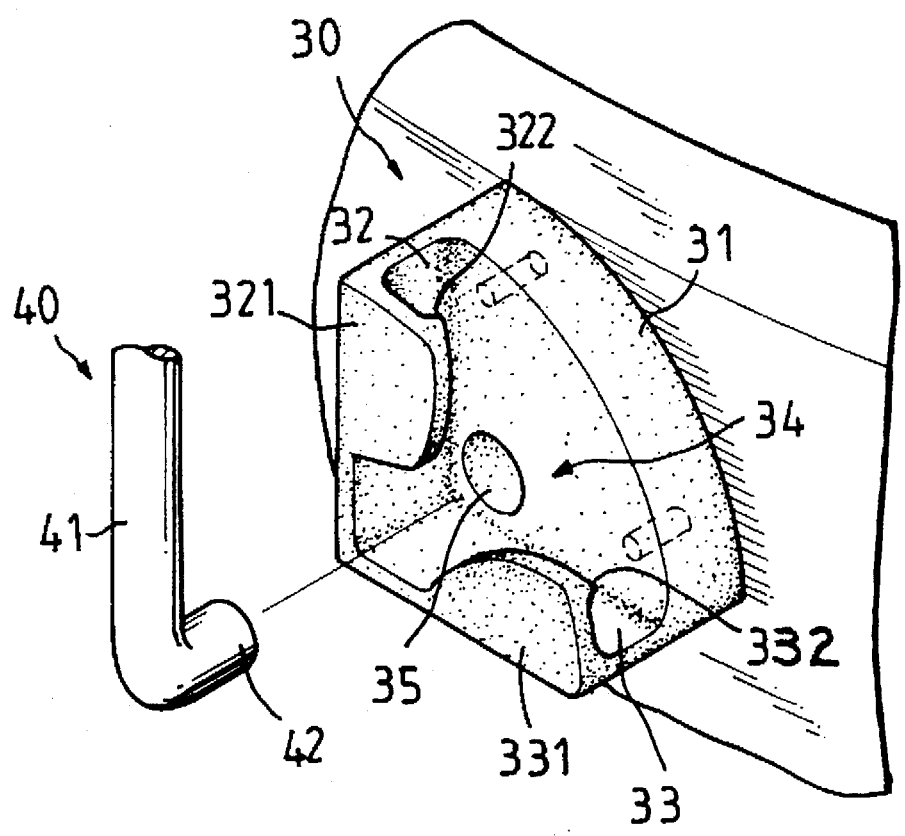
FIG. 2 is an exploded perspective of the handgrip and the ear in accordance with the present invention.

Referring to the drawings and initially to FIGS. 1 and 2, a barbecue cooker in accordance with the present invention generally includes a cover 10, a bowl 20 onto which the cover 10 is mounted, a base 22 which supports the bowl 20, two ears 30 and a handgrip 40. The cover 10 has a curved top and a handle 11 extends upwardly from a center of the top, an and air vent means 12 is provided in the cover 10.

The bowl 20 has two ears 30 diametrically disposed on an outer peripheral surface thereof, with each of the ears 30 having a curved upper surface 31, a vertical side and a horizontal side. The vertical side has a first flange 32 extending therefrom and the horizontal side has a second flange 33 extending therefrom, the first flange 32 has a first plate 321 extending perpendicularly from an outer edge thereof and the second flange 33 has a second plate 331 extending perpendicularly from an outer edge thereof so as to form a recess 34 defined by the first flange 32, the second flange 33, the first plate 321, the second plate 331 and an outer surface of the ear 30. A hole 35 is provided in each of the ears 30. The first plate 32I has a first boss 322 extending transversely, toward the recess 34, from a distal end thereof and the second plate 331 has a second boss 332 extending transversely, toward the recess 34, from a distal end thereof.

Figure 3:
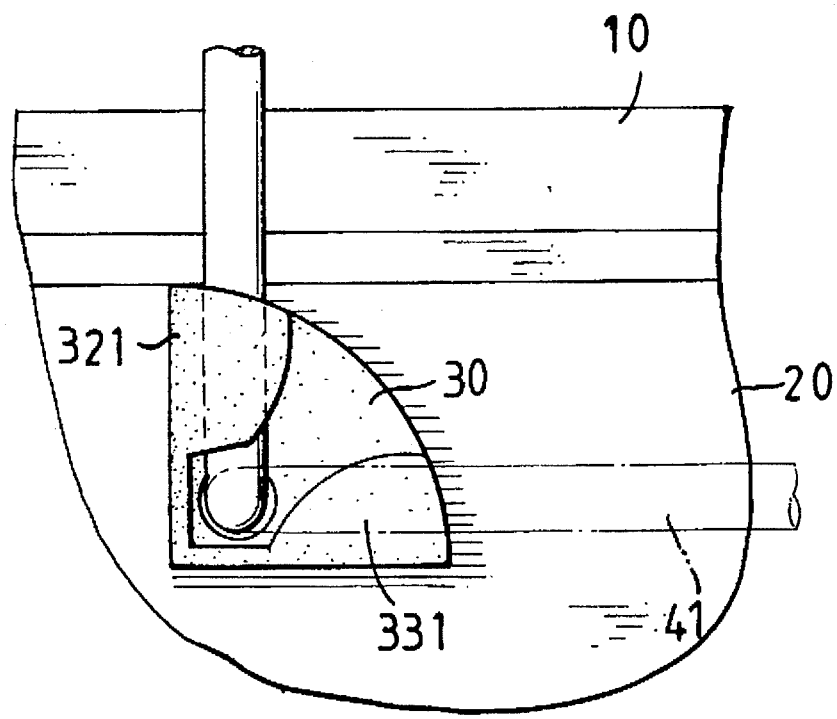
FIG. 3 is a partial elevational view showing the handgrip received in the ear wherein the handgrip is shown in phantom lines when in a horizontal position.
Figure 4:
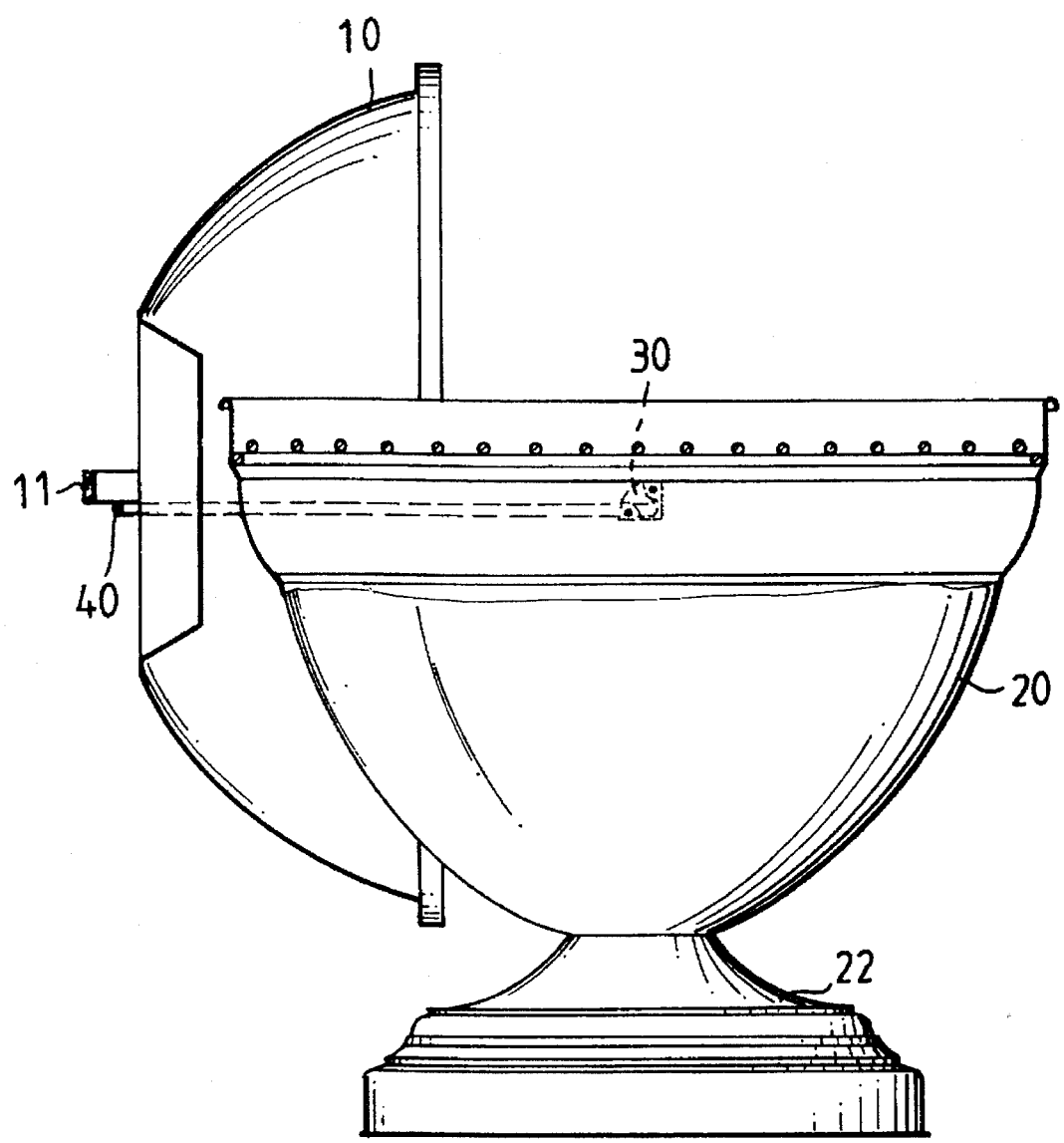
FIG. 4 is a side elevational view, partly in section, of the cover supported oil the handgrip which is in a horizontal position.

Referring to FIGS. 3 and 4, the handgrip 40 has a U-shaped configuration and has two extending portions 41 each of which has a protrusion 42 extending transversely from a distal end thereof such that the extending portion 41 can be inserted into the recess 34 via the gap defined between the first plate 321 and the second plate 331 and permit the protrusion 42 to be inserted into the hole 35. Therefore, the extending portion 41 can be securely positioned in a vertical position by rotating the extending portion 41 about an axis of the protrusion 42 and snap fitting the extending, portion 41 through the first boss 322 so as to be received between the first plate 321 and the outer surface of the ear 30. Similarly, the extending portion 41 can be securely positioned in a horizontal position by rotating the extending portion 41 about an axis of the protrusion 42 and snap fitting the extending portion 41 through the second boss 332 so as to be received between the second plate 331 and an outer surface of the ear 30.

The distance between the two extending portions 41 of the handgrip 40 is shorter than the distance between the two ears 30 such that the two extending portions 41 can be snugly received in the recess 34 when positioned in either the vertical or the horizontal position. Accordingly, the barbecue cooker can be moved or carried by lifting the handgrip 40 when the handgrip 40 is in the vertical position and if a user wants to dispose the handgrip 40 in a horizontal position, the user simply rotates the handgrip 40 to let each of the extending portions 41 be moved through the corresponding first boss 322 to exit from the vertical position and then snap fits each of the extending portions 41 through the second bosses 332 to let each of the extending portions 41 be received between the second plate 331 and the outer surface of the ear 30 corresponding thereto so as to be positioned in the horizontal position.

The distance from the outer peripheral surface of the bowl 20 to the middle portion of the handgrip 40 when the horizontal position is less than the height from the top of the cover 10 to the handle 11 such that the cover 10 can be supported by the handgrip 40 by inserting the cover 10 between the handgrip 40 and the bowl 20 and disposing the handle 11 on the handgrip 40.

Accordingly, the barbecue cooker provides a simple structure to be conveniently carried and the cover 10 can be supported on the handgrip 40 to perform as a wind shield without adding other parts.

Figure 5:
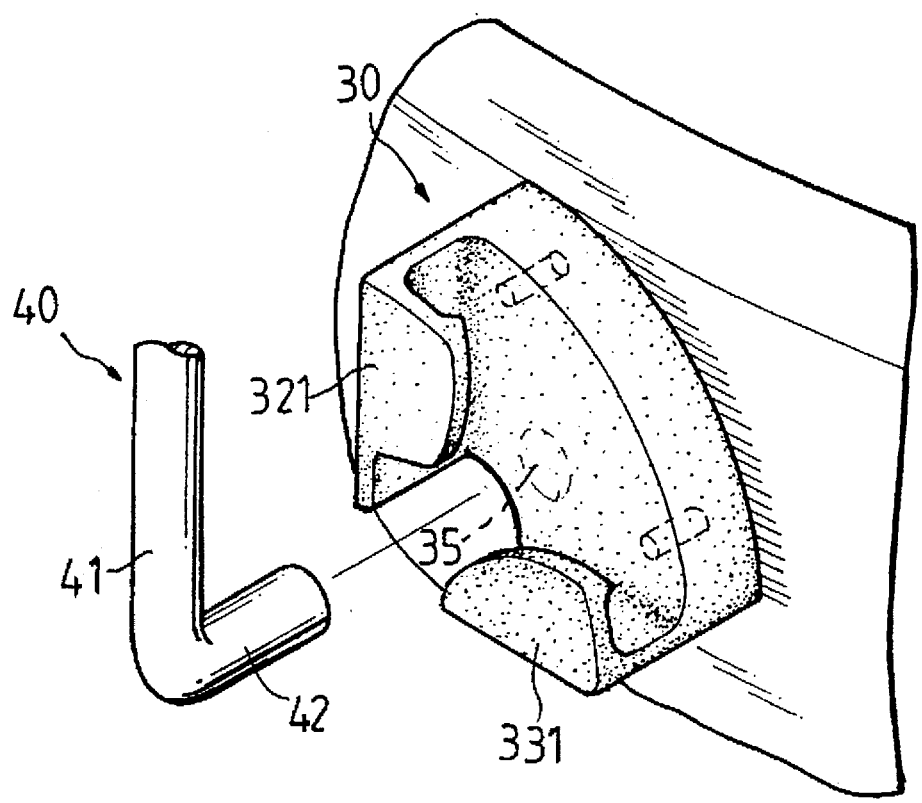
FIG. 5 is an exploded perspective view of another embodiment the ear and the handgrip.

FIG. 5 shows another embodiment of the ear 30 which can be made into a arcuate member for the purpose of saving material.

Although the invention has been explained in relation to its preferred embodiment, it is to be understood that many other possible modifications and variations can be made without departing from the spirit and scope of the invention as hereinafter claimed.

What is claimed is:

1. A barbecue cooker comprising:
   a cover having a curved top and a handle extending upwardly from a center of said top,
   a bowl, said cover adapted for mounting on said bowl;
   said bowl having two ears diametrically disposed to an outer peripheral surface thereof, each of said ears having a curved upper surface, a vertical side, a horizontal side and an outer surface, said vertical side having a first flange extending therefrom and said horizontal side having a second flange extending therefrom, said first flange having a first plate extending perpendicularly from an outer edge thereof and said second flange having a second plate extending perpendicularly from an outer edge thereof so as to define a recess between said first flange, said second flange, said first plate, said second plate and said outer surface of said ear, a hole defined in each of said ears, and a gap defined between the first and second plates; and
   a handgrip having a U-shaped configuration and having two extending portions, each extending portion having a protrusion extending transversely from a distal end thereof, each of said protrusions inserted through said gap and into said hole of said ear corresponding thereto and each of said extending portions alternatively disposable between a vertical position between said first plate and said outer surface, and a horizontal position between said second plate and said outer surface of said ear corresponding thereto.

2. The barbecue cooker as claimed in claim 1 wherein said first plate has a first boss extending from a distal end thereof and said second plate has a second boss extending from a distal end thereof.

3. The barbecue cooker as claimed in claim 1 wherein a distance between said two extending portions of said handgrip is smaller than a distance between said two ears of said bowl such that said two extending portions can be snugly received in said recess of said ear corresponding thereto.

4. The barbecue cooker as claimed in claim 1 wherein said cover has at least one air vent means disposed therein.

5. The barbecue cooker as claimed in claim 1 wherein a distance from said outer peripheral surface of said bowl to a middle portion of said handgrip is less than a height from said top of said cover to said handle.

* * * * *